US009757697B2

(12) United States Patent
Hsu et al.

(10) Patent No.: US 9,757,697 B2
(45) Date of Patent: Sep. 12, 2017

(54) SPRAY ATOMIZING OZONE WATER GENERATING APPARATUS WITH GAS STORAGE ABILITY

(75) Inventors: Gavin Hsu, Shandong (CN); Maxwell Hsu, Shandong (CN)

(73) Assignee: YANTAI UNITED OZONETEC CORPORATION, Shandong (CN)

( * ) Notice: Subject to any disclaimer, the term of this patent is extended or adjusted under 35 U.S.C. 154(b) by 378 days.

(21) Appl. No.: 13/370,928

(22) Filed: Feb. 10, 2012

(65) Prior Publication Data

US 2012/0139134 A1 Jun. 7, 2012

Related U.S. Application Data

(63) Continuation-in-part of application No. 11/995,753, filed on Jan. 15, 2008, now abandoned.

(51) Int. Cl.
*C02F 1/78* (2006.01)
*B01F 3/04* (2006.01)

(52) U.S. Cl.
CPC *B01F 3/04758* (2013.01); *B01F 2003/04886* (2013.01); *B01F 2215/044* (2013.01)

(58) Field of Classification Search
CPC . C02F 1/78; C02F 2201/782; C02F 2201/784
USPC ................. 261/78.1; 210/739, 760, 102, 139
See application file for complete search history.

(56) References Cited

U.S. PATENT DOCUMENTS 5,205,994 A * 4/1993 Sawamoto .............. C01B 13/10
205/626
7,008,535 B1 * 3/2006 Spears et al. ................. 210/220

FOREIGN PATENT DOCUMENTS

CN 2309329 * 3/1999

OTHER PUBLICATIONS

English Machine Translation of CN 2309329, Song, Mar. 1999, pp. 1-5.*

* cited by examiner

*Primary Examiner* — Claire Norris
(74) *Attorney, Agent, or Firm* — Chun-Ming Shih

(57) ABSTRACT

A spray atomizing ozone water generating apparatus with gas storage ability includes a gas-water mixing chamber with atomizing water nebulizer, a delay circuit, as well as a tap water inlet valve and an ozone water outlet valve controlled by the delay circuit. Because the mixer has ozone storage ability, atomizing water nebulizer will atomize tap water sufficiently, ozone water generating apparatus according to the invention can thus produce super high concentration ozone water having a concentration more than 30 ppm.

1 Claim, 1 Drawing Sheet

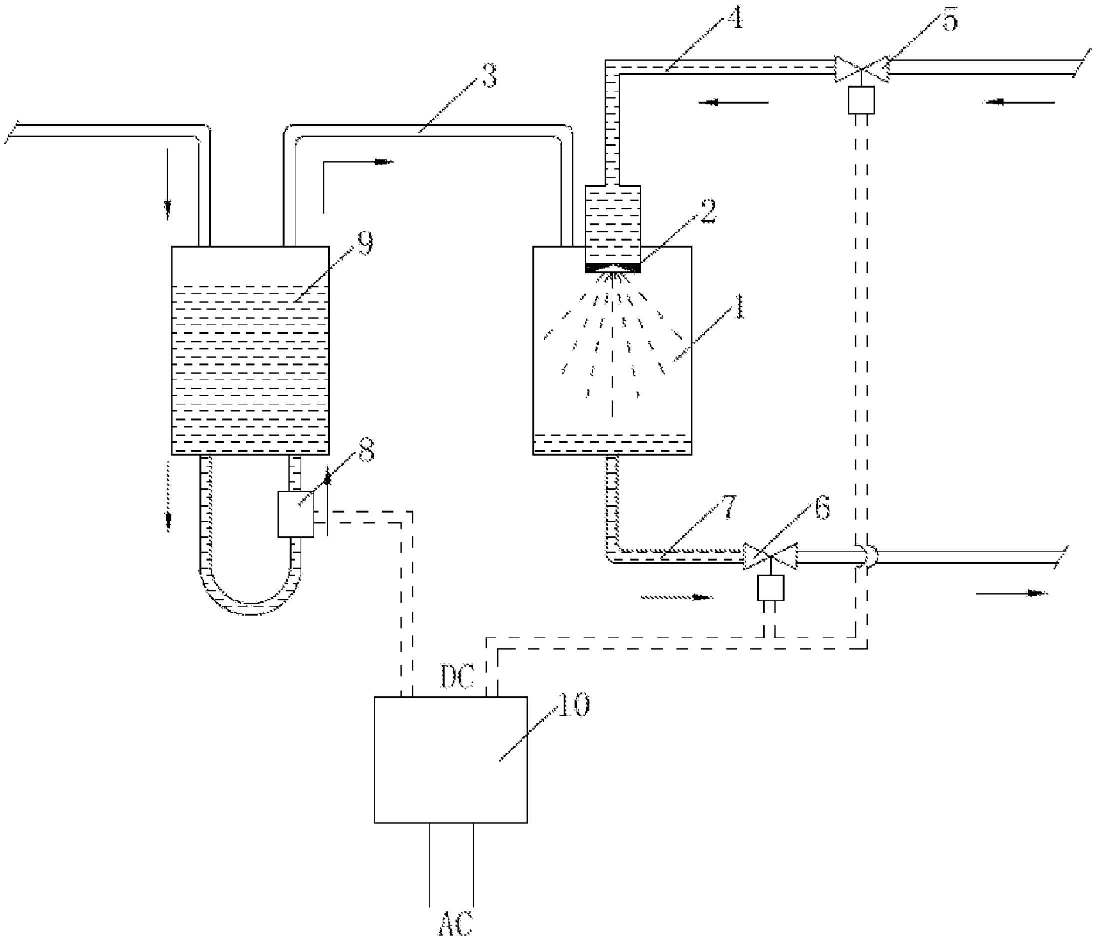
4
5
3
2
9
1
8
7
6
DC
10
AC

SPRAY ATOMIZING OZONE WATER GENERATING APPARATUS WITH GAS STORAGE ABILITY

CROSS REFERENCE

This application is a continuation-in-part of U.S. patent application Ser. No. 11/995,753, filed on Jan. 15, 2008 now abandoned.

BACKGROUND OF THE INVENTION

1. Field of the Invention

The invention patent relates to a spray atomizing ozone water generation apparatus with ozone gas storage ability.

2. Description of the Prior Art

It has been widely known that ozone or ozonated water can disinfect and kill bacteria. Ozonated water is even more applicable as a kind of disinfectant for household and medical purposes. However, the ozonated water needs to achieve a quite high degree of concentration to get better effect in killing bacteria and disinfection. The authorities in some countries have proposed some specific provisions for the concentration if the ozonated water is used for disinfecting.

For instance, under organic compound circumstances, the concentration of ozonated water as disinfectant should be defined up to 18 ppm. However, the aforesaid degree is still not high enough to kill all kinds of bacteria. To completely kill all the bacteria, we need the degree of concentration as high as 20~30 ppm. But current ozonated water generators are unable to produce ozonated water having such high degree of concentration. Theoretically, to get ozonated water with super high concentration, more ozone generators may be adopted to generate ozone gas simultaneously. But this is not practical and can not be accepted due to that it would take up too much space and consume too much energy, especially in the use of the household and medical ozonated water equipment.

The ozonated water concentration depends on the quantity of the ozone gas and the efficiency of the gas mixing with or dissolving in water. Suppose that the ozone gas is able to be prestored and subsequently get mixed with or dissolved in water by a high efficacy ozone gas and water mixing unit, then we can make super high concentration ozonated water with less ozone generators.

SUMMARY OF THE INVENTION

The purpose of this invention patent is to provide a high efficiency water atomization nebulizer and ozone gas storage for an ozonated water generation device.

The invention patent provides a spray atomizing ozone water generation apparatus with gas storage ability. It contains a gas-water mixing chamber to store the ozone gas, an atomizing water nebulizer at the top of the mixing chamber, an input water pipe connected to the atomizing water nebulizer, a tap water inlet valve built in the input pipe, an input ozone pipe at the top of the mixing chamber, an output ozonated water pipe at the bottom of the chamber, and an ozone water outlet valve built in the output pipe. It also contains a delay circuit to control the tap water inlet valve, the ozone water outlet valve and the ozone generator.

The device has no restriction on ozone gas sources. It can be applied to any kind of ozone generator. However we recommend electrolytic ozone generators.

Working Principle

This is the working principle of the present invention:

When the ozonated water generator starts working, the delay circuit controls the tap water inlet and ozone water outlet valves to keep closed for a while. During this period of time, the ozone generator continuously generates ozone gas that would further come into the mixing chamber and stored therein. After the delay time, the two valves are switched on under the control of the delay circuit. Then the input water sprayed from the atomizing water nebulizer is formed into water mist for mixing with the ozone gas, thus producing high concentration ozonated water which then comes out through the ozonated water pipe.

When turning off the ozonated water generator, the ozonated water stops output immediately. But as controlled by the delay circuit, the ozone generator keeps on generating ozone gas that would be stored into the mixing chamber. So when turning on the ozonated water generator next time, the input water comes through the atomizing water nebulizer to become water mist, and the water mist mixes with the ozone gas already stored in the chamber to produce ozonated water with high concentration which further comes out through the ozonated water pipe.

The amount of the ozone gas stored in the mixing chamber is adjustable since the delay time is adjustable. Under the control of the delay circuit, the tap water inlet valve, the ozone water outlet valve and the ozone generator are efficiently adjusted, namely the delay circuit makes the ozone generator continuously generate ozone gas that would be stored in the mixing chamber. The longer the delay time is, the more ozone gas is stored, and the ozonated water with higher concentration is produced. Storing ozone gas in mixing chamber can have the equivalent effects as supplying ozone gas simultaneously generated by several ozone generators. Thus, this invention not only produces super high-concentration ozonated water but also makes equipment compact.

BRIEF DESCRIPTION OF THE DRAWINGS

FIG. 1 is a schematic diagram showing an ozonated water generation apparatus of the present invention.

DETAILED DESCRIPTION OF THE PREFERRED EMBODIMENTS

Embodiment 1

See FIG. 1, a pure water tank 9 contains a water level sensor connected to circuitry to control the up and low water level and maintain it within a certain water level, i.e. a predetermined minimum and maximum water level. Within the pure water tank 9, a minimum space above the water level must be maintained for ozone gas storage. when the ozone generator 8 starts working to generate ozone, it produces ozone gas and bubble under pressure. Both of the gas and bubble enter into the pure water tank 9. The ozone gas and bubble will pass through the pure water of pure water tank 9. A portion of the ozone gas and bubble under pressure will be dissolved into the pure water, while a large portion will pass through the pure water, un-dissolved, for storage in the minimum space above the up pure water level in the pure water tank 9. Meanwhile, the delay circuit 10 delays switching on the tap water inlet valve 5 on the input water pipe 4 and the ozone water outlet valve 6 on the ozonated water pipe 7, but still keeps the ozone generator 8 to continuously generate ozone gas so that the ozone gas can comes into the mixing chamber 1 through an input ozone gas pipe 3 and stored therein. After the delay time, the delay circuit 10 switches on the two valves 5 and 6, and the input water 4 within the input water pipe 4 comes through the atomizing water nebulizer 2 to become water mist and mix with the ozone gas. Thus ozonated water with over 30 ppm super high concentration is produced and then comes out through ozonated water pipe 7.

Embodiment 2

See FIG. 1, when turning off the ozonated water generator of the present invention, the delay circuit 10 immediately switches off the tap water inlet valve 5 and the ozone water outlet valve 6, but keeps the ozone generator 8 to continuously generate ozone gas for a while so that the ozone gas comes into the mixing chamber 1 and stored therein. While the ozonated water generator operates next time, the delay circuit 10 immediately switches on the two valves 5 and 6, so that the water comes into the mixing chamber 1 through the atomizing water nebulizer 2 as water mist which further mixes with and dissolves in the prestored ozone gas to produce high concentration ozonated water that then comes out through ozonated water pipe 7.

Embodiment 3

See FIG. 1, when the ozone generator 8 starts working, the delay circuit 10 delays switching on the tap water inlet valve 5 and the ozone water outlet valve 6. As controlled by the delay circuit 10, the tap water inlet valve 5 would be repeatedly turned off and then on, whereby the water can intermittently come into the mixing chamber 1, and the ozone generator 8 still continuously generates an ozone gas so that the ozone gas keeps on coming into the mixing chamber 1 and stored therein. When both tap water inlet valve 5 and ozone water outlet valve 6 are switched on, the water through atomizing water nebulizer 2 comes into the mixing chamber 1 as water mist to mix with and dissolve in the ozone gas, thus producing high concentrating ozonated water that then comes out through the ozonated water pipe 7.

We claim:

1. A spray atomizing ozone water generation apparatus with ozone gas storage ability, including:

a gas-water mixing chamber (1);

an atomizing water nebulizer (2) at a top of the mixing chamber (1);

an input water pipe (4) connected to the atomizing water nebulizer (2);

a tap water inlet valve (5) built in the input pipe (4);

an input ozone gas pipe (3) extending from the top of the mixing chamber (1);

a pure water tank (9) connected to the input ozone gas pipe (3), containing pure water at a predetermined water level;

a U-shaped pipe with two ends connecting to the bottom of the pure water tank (9);

an ozone generator (8) installed on the U-shaped pipe to connect with the pure water tank (9), wherein when the ozone generator (8) starts working to generate ozone, ozone gas and bubble under pressure are produced to enter into the pure water tank (9) and pass through the pure water, and a portion of the ozone gas is dissolved into the pure water, while a large portion of the ozone gas passes through the pure water, un-dissolved, for storage in a space above the water predetermined level in the pure water tank (9);

an output ozonated water pipe (7) at the bottom of the mixing chamber (1);

an ozone water outlet valve (6) built in the output pipe (7); and a delay circuit (10) directly connected to and controlling the tap water inlet valve (5), the ozone water outlet valve (6), and the ozone generator (8), wherein the delay circuit (10) repeatedly switches on and off the tap water inlet valve (5) and the ozone water outlet valve (6) while keeps the ozone generator (8) continuously generating the ozone to make the ozone gas come into the mixing chamber (1) through the input ozone as pipe (3), and input water within the input water pipe (4) comes through the atomizing water nebulizer (2) to become water mist and mix with the ozone gas so that ozonated water with a concentration of the ozone over 30 ppm is produced and stored in the mixing chamber (1).

* * * * *